No. 714,987. Patented Dec. 2, 1902.
M. W. WOLFE.
INTERLOCKING BOARD.
(Application filed Feb. 17, 1902.)
(No Model.)

WITNESSES:

INVENTOR
Martin W. Wolfe
BY
ATTORNEYS

UNITED STATES PATENT OFFICE.

MARTIN WILFORD WOLFE, OF NEW LEXINGTON, OHIO.

INTERLOCKING BOARD.

SPECIFICATION forming part of Letters Patent No. 714,987, dated December 2, 1902.

Application filed February 17, 1902. Serial No. 94,473. (No model.)

*To all whom it may concern:*

Be it known that I, MARTIN WILFORD WOLFE, a citizen of the United States, and a resident of New Lexington, in the county of Perry and State of Ohio, have invented new and useful Improvements in Interlocking Boards, of which the following is a full, clear, and exact description.

The invention relates to carpentry; and its object is to provide certain new and useful improvements in interlocking boards such as are used for car-roofs, floors, ceilings, sidings, decks of vessels, and the like, and whereby leakage is prevented and shrinkage is reduced to a minimum.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
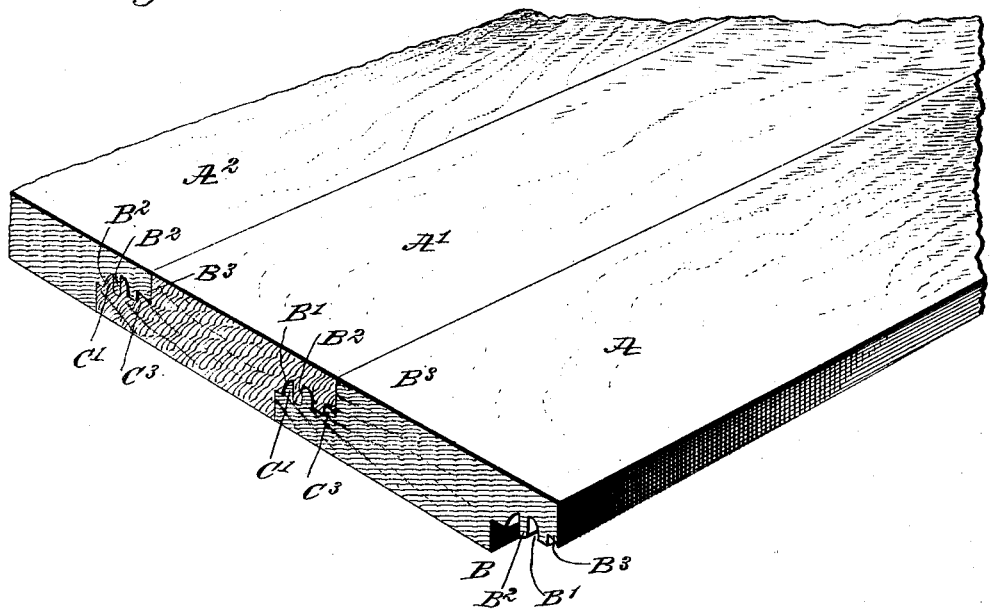
Figure 2:
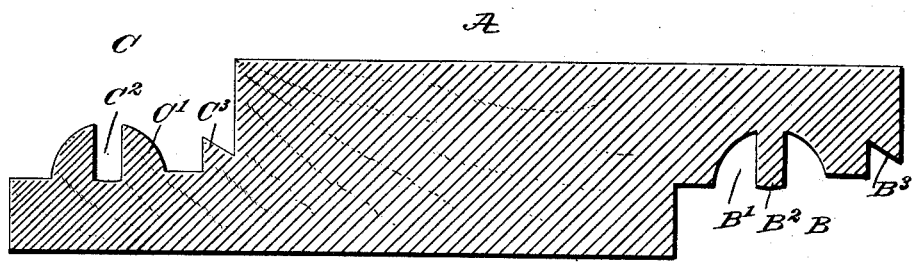
Figure 3:
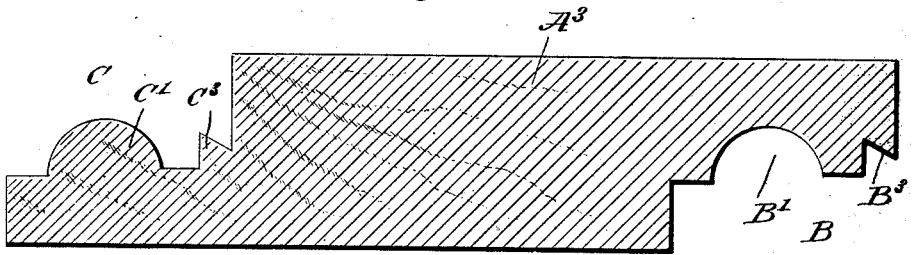

Figure 1 is a perspective view of the improvement. Fig. 2 is an enlarged cross-section of one of the boards, and Fig. 3 is a like view of a modified form of the same.

Each of the interlocked boards A A' A² (shown in Fig. 1) is formed at opposite faces adjacent to the ends with longitudinally-extending recesses B and C, of which the recess C is deeper than the recess B, and the latter is formed in its bottom with a longitudinally-extending groove B', in which rises an integral tongue B², as plainly indicated in Figs. 1 and 2. From the bottom of the other recess C rises a tongue C', corresponding in shape to the groove B' and provided at its top with a longitudinally-extending groove C², corresponding in shape to the tongue B². The inner wall of the recess C is formed with a beveled shoulder C³, and a similar beveled shoulder B³ is formed in the bottom of the recess B at the outer end thereof, as will be readily understood by reference to Fig. 2. Now when the boards A, A', and A² are jointed together then the tongue B² of one board engages the groove C² of the adjacent board and the tongue C' fits into the groove B' and at the same time the beveled shoulders B³ and C³ interlock with each other, as will be readily understood by reference to Fig. 1. Now by the arrangement described the interlocked double tongues and grooves C' B² and B' C², as well as the interlocked shoulders C³ B³, prevent the boards from moving apart, and at the same time the said interlocked parts form such a tight joint as to prevent leakage. By having the tongues C' and B² rounded off, as indicated in the drawings, the various interlocking parts can be readily fitted together, and fastening devices, such as nails and the like, are not required to securely fasten adjacent boards to each other.

It is understood that the recesses, tongues, and grooves can be readily formed in tonguing-and-grooving machines.

In practice the boards are laid in white lead in the usual manner, and boards united as described prevent water or moisture from reaching the vital parts of the joint, as water that may possibly enter at the adjacent edges will be carried off at the interlocked beveled shoulders, and hence the water does not penetrate to or reach the double grooves and tongues. The latter extend about midway between the faces of the boards, and hence are to a great extent protected from climatic influences, and by the use of the interlocked tongues and grooves shrinkage is reduced to a minimum and the boards can only shrink in the direction of their length. By having the double tongues and grooves extending in the direction of the thickness of the boards it is evident that the boards are not liable to open up at the interlocked sides, and as the tongues and grooves are very substantially built they readily resist opening of the joint on shrinkage of the boards. By the arrangement described the boards can be readily jointed in a vertical direction instead of sidewise, as heretofore practiced by the use of boards having ordinary tongues and grooves.

The recess B on the under face of the board is made less deep than the recess C, so that when the boards are jointed the top portion of the joint is thicker than the bottom portion to withstand heavy strains incident to moving loads over the jointed boards.

In the modified form shown in Fig. 3 the tongues B² in the recess B' and the groove C² in the tongue C' of the board A³ are omitted; but otherwise the construction is the same as the one above described and shown in Figs. 1 and 2.

Having thus described my invention, I claim as new and desire to secure by Letters Patent—

1. A board, provided on opposite faces adjacent to its side edges with recesses extending lengthwise of the board, the recess on one face of the board having its bottom formed with a longitudinal groove; the bottom of the other recess having an integral tongue, the inner side walls of one of the recesses having a beveled shoulder, and the other recess being formed at its outer end with a corresponding shoulder, as set forth.

2. A board, provided on opposite faces adjacent to its side edges with recesses extending lengthwise of the board, the recess on one face of the board having its bottom formed with a longitudinal groove; the bottom of the other recess having an integral tongue, the inner side walls of one of the recesses having a beveled shoulder, and the other recess being formed at its outer end with a corresponding shoulder, the said recesses being of different depths, as set forth.

3. A board, provided on opposite faces adjacent to its side edges, with recesses extending lengthwise of the board, the recess at one face of the board having its bottom formed with a longitudinal groove and a tongue rising in the groove, the bottom of the other recess having an integral tongue formed with a longitudinal groove, as set forth.

4. A board, provided on opposite faces adjacent to its side edges, with recesses extending lengthwise of the board, the recess at one face of the board having its bottom formed with a longitudinal groove and a tongue rising in the groove, the bottom of the other recess having an integral tongue formed with a longitudinal groove, the inner side wall of one of the recesses having a beveled shoulder and the other recess being formed at its outer end with a corresponding shoulder, as set forth.

In testimony whereof I have signed my name to this specification in the presence of two subscribing witnesses.

MARTIN WILFORD WOLFE.

Witnesses:
CHARLES C. GUY,
A. B. MCKEEVER.